United States Patent
Zhang et al.

(10) Patent No.: US 12,260,547 B2
(45) Date of Patent: Mar. 25, 2025

(54) MACHINE VISION-BASED AUTOMATIC IDENTIFICATION AND RATING METHOD AND SYSTEM FOR LOW-MAGNIFICATION ACID ETCHING DEFECT

(71) Applicant: DAYE SPECIAL STEEL CO., LTD., Huangshi (CN)

(72) Inventors: Zhicheng Zhang, Huangshi (CN); Jin Ke, Huangshi (CN); Wei Fang, Huangshi (CN); Shaoyang Zhang, Huangshi (CN); Changyuan Zhang, Huangshi (CN)

(73) Assignee: DAYE SPECIAL STEEL CO., LTD., Hubei (CN)

( * ) Notice: Subject to any disclaimer, the term of this patent is extended or adjusted under 35 U.S.C. 154(b) by 72 days.

(21) Appl. No.: 18/260,408

(22) PCT Filed: Dec. 29, 2021

(86) PCT No.: PCT/CN2021/142662
§ 371 (c)(1),
(2) Date: Jul. 5, 2023

(87) PCT Pub. No.: WO2022/117118
PCT Pub. Date: Jun. 9, 2022

(65) Prior Publication Data
US 2024/0233112 A1   Jul. 11, 2024

(30) Foreign Application Priority Data
Jan. 6, 2021 (CN) .......................... 202110013619.6

(51) Int. Cl.
*G06T 7/00* (2017.01)
*C23F 1/00* (2006.01)
(Continued)

(52) U.S. Cl.
CPC .......... *G06T 7/001* (2013.01); *G06F 18/2132* (2023.01); *G06T 7/11* (2017.01);
(Continued)

(58) Field of Classification Search
CPC . G06T 7/001; G06T 7/11; G06T 7/174; G06F 18/00; G06F 18/2132; C23F 1/00
See application file for complete search history.

(56) References Cited

U.S. PATENT DOCUMENTS

| 4,519,041 A | 5/1985 | Fant et al. |
| 10,753,882 B1 | 8/2020 | Mahajan et al. |

(Continued)

FOREIGN PATENT DOCUMENTS

| CN | 102980893 A | 3/2013 |
| CN | 111299318 B | 6/2020 |

(Continued)

*Primary Examiner* — Kenny A Cese
(74) *Attorney, Agent, or Firm* — United IP Counselors, LLC

(57) ABSTRACT

A machine vision-based automatic identification and rating method and system for a low-magnification acid etching defect. The method is used for automatically identifying and rating a defect of a low-magnification aid etching sample of an steel material or a steel billet or a continuous casting billet after acid etching, and comprises: according to a first preset condition, performing image acquisition on the low-magnification acid etching sample of the steel material to obtain a first image (S101); performing automatic image processing on the first image to obtain a second image (S102); according to a second preset condition, performing image segmentation on the second image to obtain a third image (S103); according to a pre-known defect type, performing defect mode identification on the third image to obtain the distribution data of defect modes in the low-magnification acid etching sample (S104); obtaining the quantitative data of various defect modes in the low-magnification acid etching (Continued)

sample according to the third image and the distribution data of the defect modes in the low-magnification acid etching sample (S105); and performing rating on the defect in the low-magnification acid etching sample according to the quantitative data of the defect modes in the low-magnification acid etching sample (S106).

10 Claims, 6 Drawing Sheets

(51) Int. Cl.
    *G06F 18/00*     (2023.01)
    *G06F 18/2132*     (2023.01)
    *G06T 7/11*     (2017.01)
    *G06T 7/174*     (2017.01)
    *G06V 10/75*     (2022.01)

(52) U.S. Cl.
    CPC ............ *G06T 7/174* (2017.01); *G06V 10/751* (2022.01); *C23F 1/00* (2013.01); *G06T 2207/30136* (2013.01)

(56) References Cited

U.S. PATENT DOCUMENTS

| | | |
|---|---|---|
| 2004/0064269 A1 | 4/2004 | Shibuya et al. |
| 2004/0145734 A1* | 7/2004 | Shibata ................ G01N 21/956 356/237.5 |
| 2019/0073552 A1 | 3/2019 | Yang et al. |

FOREIGN PATENT DOCUMENTS

| | | |
|---|---|---|
| CN | 111899230 A | 11/2020 |
| CN | 112669307 A | 4/2021 |
| JP | 1984037450 | 2/1984 |
| JP | 1995306161 | 11/1995 |
| JP | 1998209230 | 8/1998 |
| JP | 2004117229 A | 4/2004 |
| JP | 2012043436 A | 3/2012 |
| JP | 2019530882 A | 10/2019 |

* cited by examiner

Fig.11
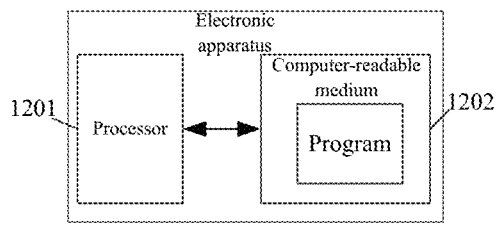
Fig.12
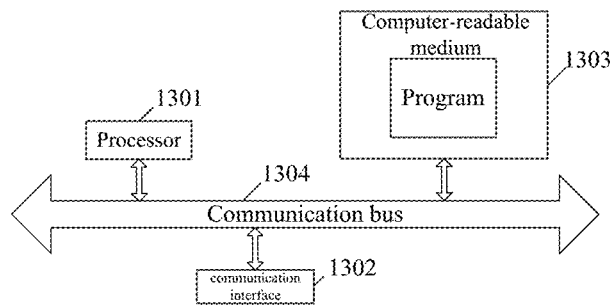
Fig.13

MACHINE VISION-BASED AUTOMATIC IDENTIFICATION AND RATING METHOD AND SYSTEM FOR LOW-MAGNIFICATION ACID ETCHING DEFECT

TECHNICAL FIELD

The present application relates to the technical field of metallurgical physical detection, especially relates to a machine vision-based automatic identification and rating method and system for low-magnification acid etching defect.

BACKGROUND low-magnification (macroscopic) inspection is a kind of macroscopic physical inspection item. Generally, the naked eye or a magnifying glass of no more than ten times is used to inspect the acid-etched metal surface, fracture or macroscopic structure and its defects. Macro inspection includes low-magnification defect inspection (acid etching, sulfur mark, tower shape) and fracture analysis, etc. The so-called low-magnification inspection usually refers to the acid etching inspection of the transverse end face of steel or steel billet or continuous casting billet. This is one of the internationally common internal quality inspection methods for steel, and also an effective method in quality control of large-scale production process, which has been widely used, and is currently one of the required inspection items for almost all continuous casting billet and round steel varieties. The general procedure is: test sample-machining-acid etching-ranking-report, etc., in which the acid etching and ranking process completely depends on manual reference of spectrum ranking. The accuracy of ranking results depends on the manual understanding of the spectrum, lack of digital ranking standards, and the test sample after ranking cannot be retained for a long time, lacking traceability.

Therefore, there is a need to provide an improved solution to the above-mentioned deficiencies of the prior art.

SUMMARY

It is an object of the present application to provide a method and a machine vision-based automatic identification and rating system for low-magnification acid etching defect so as to solve or alleviate the above-mentioned problems in the prior art.

In order to achieve the above object, the present application provides the following technical solutions:

the present application provides a machine vision-based automatic identification and rating method for low-magnification acid etching defect, used for automatically recognizing and ranking defects of low-magnification acid-etched steel or steel billet or continuous casting billet sample after acid etching, comprising: acquiring images of a low-magnification acid-etched sample according to a first pre-set condition to obtain a first image; performing automatic image processing on the first image to obtain a second image; performing image segmentation on the second image according to a second pre-set condition, to obtain a third image; performing defect pattern recognition on the third image according to a pre-known defect type, and obtaining distribution data of defect patterns in the low-magnification acid-etched sample; obtaining quantitative data of defect patterns in the low-magnification acid-etched sample according to the third image and the distribution data of defect patterns in the low-magnification acid-etched sample; ranking the defects in the low-magnification acid-etched sample according to the quantitative data of defect patterns in the low-magnification acid-etched sample.

Optionally, in any of the embodiments of the present application, in step of acquiring images of the low-magnification acid-etched sample according to the first pre-set condition to obtain the first image, specifically: acquiring images of the low-magnification acid-etched sample according to a set image background and scale to obtain the first image.

Optionally, in any of the embodiments of the present application, in step of performing image segmentation on the second image according to the second pre-set condition to obtain the third image, specifically: taking the centre of the second image as the centre of a circle, performing concentric circle segmentation on the second image, and simultaneously performing quadrant segmentation on the second image according to a quadrant segmentation line of a pre-set quadrant to obtain the third image.

Optionally, in any of the embodiments of the present application, in step of performing defect pattern recognition on the third image according to the pre-known defect type, and obtaining distribution data of defect patterns in the low-magnification acid-etched sample, specifically: performing feature extraction on the third image to obtain a defect feature in the third image, and performing defect pattern recognition on the defect feature according to pre-divided defect types, obtaining distribution data of defect patterns in the low-magnification acid-etched sample.

Optionally, in any embodiment of the present application, in step of obtaining quantitative data of defect patterns in the low-magnification acid-etched sample according to the third image and the distribution data of defect patterns in the low-magnification acid-etched sample, specifically: performing digital analysis on the distribution data of the defect pattern in the low-magnification acid-etched sample corresponding to the third image to obtain quantitative data of the defect patterns in the low-magnification acid-etched sample.

Optionally, in any embodiment of the present application, in step of ranking the defects in the low-magnification acid-etched sample according to the quantitative data of defect patterns in the low-magnification acid-etched sample, specifically: comparing the quantitative data of the defect patterns in the low-magnification acid-etched sample with a preset quantitative standard, and ranking the defects in the low-magnification acid-etched sample according to a comparison result.

Optionally, in any embodiment of the present application, the defect types comprise: point defects, line defects and plane defects; wherein, the point defects include porosity, non-metallic inclusions, heterometallic inclusions and point segregation; the line defects comprise subcutaneous cracks, central cracks, intermediate cracks, corner cracks, teeming lap (skull patch) and flakes (white spots); the plane defects include carbon segregation, square segregation (box segregation).

The embodiments of the present application also provides a machine vision-based automatic identification and rating system for low-magnification acid etching defect, used for automatically recognizing and ranking defects of the low-magnification acid-etched steel or steel billet or continuous casting billet sample after acid etching, comprising: an image acquisition unit, configured to acquire images of the low-magnification acid-etched sample according to a first pre-set condition to obtain a first image; an image processing unit, configured to perform automatic image processing on the first image to obtain a second image; an image segmentation unit, configured to perform image segmentation on the second image according to a second pre-set condition to obtain a third image; a defect recognition unit, configured to perform defect pattern recognition on the third image according to a pre-divided defect type and obtain distribution data of defect patterns in the low-magnification acid-etched sample; a defect quantification unit, configured to obtain quantitative data of defect patterns in the low-magnification acid-etched sample according to the third image and the distribution data of defect patterns in the low-magnification acid-etched sample; and a defect ranking unit, configured to rank the defects in the low-magnification acid-etched sample according to the quantitative data of defect patterns in the low-magnification acid-etched sample.

Embodiments of the present application also provide a computer-readable medium on which a computer program is stored, the program is a machine vision-based automatic identification and rating method for low-magnification acid etching defect as described in any of the above embodiments.

The embodiments of the present application also provides an electronic apparatus, including: a memory, a processor, and a program stored in the memory and can be executed by the processor, when the processor executes the program, the machine vision-based automatic identification and rating method for low-magnification acid etching defect described in any of the above embodiments is implemented.

Compared with the Closest Prior Art, the Technical Solutions of the Embodiments of the Present Application have the Following Beneficial Effects In the timely solution provided by the embodiments of the present application, the defects existing in the low-magnification acid-etched sample of steel or steel billets or continuous casting billet are recognized and ranked by computer machine vision and pattern recognition, which effectively avoids the problem of indicating qualitative description in each low-magnification defect ranking graph without quantitative assessment, so that the defects existing in the low-magnification acid-etched sample are recognized and ranked without relying on the visual impression of the inspector and the degree of recognition of the defects, etc., but the defects existing in the low-magnification acid-etched sample are automatically assessed by machine learning through image recognition of defect features. It effectively improves the accuracy of automatic recognition and ranking of defects of low-magnification acid-etched sample, and realizes automatic recognition and ranking of defects under different types (such as bearing steel, gear steel, structural steel, stainless steel, tool steel, die steel, etc.) and different states (such as continuous casting, die casting, electro slag, rolled material, etc.).

BRIEF DESCRIPTION OF THE DRAWINGS

The accompanying drawings that constitute a part of the present application are used to provide further understanding of the present application, and the schematic embodiments and descriptions of the present application are used to explain the present application and do not constitute an improper limitation of the present application. Wherein:

FIG. 11 is a schematic diagram of partial code according to the software shown in FIG. 9;

FIG. 12 is a block diagram of an electronic apparatus provided according to some embodiments of the present application;

FIG. 13 is a hardware structure of an electronic apparatus provided according to some embodiments of the present application.

DETAILED DESCRIPTION OF THE EMBODIMENTS

Figure 1:
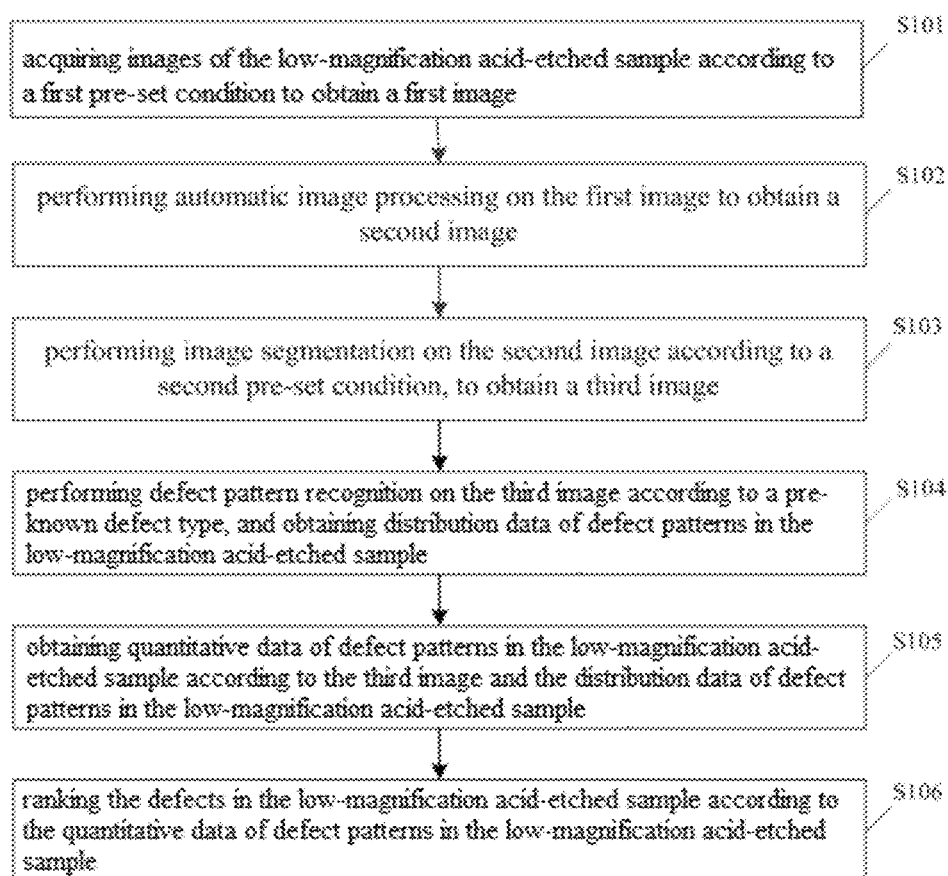
FIG. 1 is a schematic flow diagram of the machine vision-based automatic identification and rating method for low-magnification acid etching defect according to some embodiments of the present application.

The present application will be described in detail below with reference to the accompanying drawings and in conjunction with the embodiments. The various embodiments are provided by way of interpretation of the application and not limiting the application. Indeed it will be apparent to those skilled in the art that modifications and variations may be made in the present application without departing from the scope or spirit of the application. For example features shown or described as part of one embodiment may be used in another embodiment to produce yet another embodiment. It is therefore desirable that the application encompass such modifications and variations falling within the scope of the appended claims and their equivalents.

In the description of the present application, the terms "longitudinal," "transverse," "up," "down," "front," "back," "left," "right," "vertical," "horizontal," "top," "bottom," and the like denote orientation or positional relationships based on those shown in the drawings and are intended for ease of description only and not to require that the present application must be constructed and operated in a particular orientation and therefore cannot be construed as limiting to the present application. The terms "joint", "connected" and "set" used in the present application should be understood in a broad sense, for example, may be a fixed connection or a detachable connection; It can be directly connected or indirectly connected through intermediate components; It may be a wired electrical connection, a radio connection, or a wireless communication signal connection, and the specific meanings of the above terms may be understood by those of ordinary skill in the art on a case-by-case basis.

Example of Method

FIG. 1 is the schematic flow diagram of the machine vision-based automatic identification and rating method for low-magnification acid etching defect according to some embodiments of the present application. As shown in FIG. 1, the machine vision-based automatic identification and rating method for low-magnification acid etching defect for steel, used for automatically recognizing and ranking defects of the low-magnification acid-etched steel or steel billet or continuous casting billet sample after acid etching, comprising:

step S101, acquiring images of the low-magnification acid-etched sample according to a first pre-set condition to obtain a first image;

In the embodiments of the present application, the unprocessed sample is machined. The machining is generally a turning process perpendicular to the axial direction of the steel; the machined sample is placed in an acidic medium configured as specified, and the etching test is performed with the acidic medium to make the sample. The surface of the sample is moderately etched, so that the inherent defects on the cross-section of the sample are exposed after the moderate etching, and the acid-etched sample is dehumidified and dried to obtain a low-magnification acid-etched sample. It is to be understood that the above description is intended to be illustrative, and not restrictive, of the embodiments of the present application.

In embodiments of the present application, a digital camera may be used to take a photograph of a cross section of the low-magnification acid-etched sample to complete image acquisition of the low-magnification acid-etched sample. In the process of image acquisition, in order to make the image effect of the collected low-magnification acid-etched sample better and more conducive to recognize and rank the defects of the low-magnification acid-etched sample, the process of image acquisition of the low-magnification acid-etched sample is usually completed according to preset conditions. It is to be understood that the above description is intended to be illustrative, and not restrictive, of the embodiments of the present application.

In some optional embodiments, in step of acquiring images of the low-magnification acid-etched sample according to the first pre-set condition to obtain the first image, specifically: acquiring images of the low-magnification acid-etched sample according to the set image background and scale to obtain the first image. It is to be understood that the above description is intended to be illustrative, and not restrictive, of the embodiments of the present application.

In embodiments of the present application, the system performs locking and color comparison on the low-magnification acid-etched sample by setting a uniform image background and scale, so as to improve the pixels of the image of the acquired low-magnification acid-etched sample, thereby facilitating the measurement, recognition and raking of defects in the low-magnification acid-etched sample; it is convenient to obtain the specification information of the low-magnification acid-etched sample, and correspond to the corresponding steel or steel billet or continuous casting billet, so as to recognize and digitally evaluate the defects. It is to be understood that the above description is intended to be illustrative, and not restrictive, of the embodiments of the present application.

In embodiments of the present application, a digital camera or a video camera is used to detect the low-magnification acid-etched sample for obtaining digital images of the low-magnification acid-etched sample, so as to realize image acquisition of the low-magnification acid-etched sample. In the process of image acquisition of low-magnification acid-etched sample by digital camera, in order to meet the light conditions when taking pictures by digital camera, a light source system (such as LED light source) can be set up to supplement the light of low-magnification acid-etched sample, which can effectively offset the influence of weather or light at different times on the imaging effect of low-magnification acid-etched steel sample. It is to be understood that the above description is intended to be illustrative, and not restrictive, of the embodiments of the present application.

In the embodiments of the present application, the digital camera acquires (collects) images of the low-magnification acid-etched sample, and after obtaining the first image, it is stored in a low-magnification image database for long-term retention, and the source can be traced by calling the first image stored in the low-magnification image database at any time. It is to be understood that the above description is intended to be illustrative, and not restrictive, of the embodiments of the present application.

In step S102, performing automatic image processing on the first image to obtain a second image;

In the embodiments of the present application, in the process of image acquisition of the low-magnification acid-etched sample by the digital camera, the light source conditions will be inevitably affected by external factors (such as: climate, time, etc.). During the process of image acquisition, the photosensitive elements of the digital camera will affect the original color of the low-magnification acid-etched sample. In order to correct the influence of the pipeline and the lens on the color, so that the first image acquired is more realistic, and the defect recognition and ranking of the low-magnification acid-etched is more accurate, the automatic processing of the image is realized through the adaptive adjustment of the algorithm, and the effect of external light, environment, weather, etc. is effectively avoided. For example, the gray scale and white balance adjustment are performed on the first image, so as to improve the effect of defect recognition on the low-magnification acid-etched steel sample through RGB colors. It is to be understood that the above description is intended to be illustrative, and not restrictive, of the embodiments of the present application.

In embodiments of the present application, the first image photographed in the digital camera can be read by a front-end acquisition apparatus (such as an image acquisition card), and the second image can be obtained by performing automatic image processing techniques such as grey scale and white balance, red (R) green (G) blue (B) primary color resolution color signals on the first image. In this process, it is also possible to use a front-end display to collect the image of the low-magnification acid-etched sample by the digital camera, the front-end acquisition apparatus to read the first image in the digital camera, and the front-end acquisition apparatus to perform real-time monitoring and manual intervention on the process of processing the gray scale and white balance of the first image, so as to find out anomalies and take corresponding measures in time. It is to be understood that the above description is intended to be illustrative, and not restrictive, of the embodiments of the present application.

Figure 2:
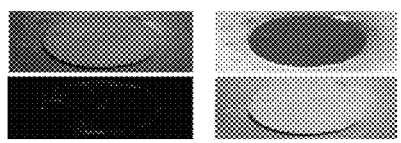
FIG. 2 is a schematic illustration of a second image USM sharpening in a low-magnification acid-etched sample provided according to some embodiments of the present application.

In embodiments of the present application, a large number of computer algorithms are also used to perform processing means such as sharpening on the first image (for example, USM sharpening, as shown in FIG. 2), so as to improve the clarity of the first image, to make the color of the first image more obvious and the edge of the first image more clear, thereby improving the accuracy rate of defect recognition of the low-magnification acid-etched sample. It is to be understood that the above description is intended to be illustrative, and not restrictive, of the embodiments of the present application.

In embodiments of the present application, the impurities, noises, etc. existing on the surface of the low-magnification acid-etched sample in the first image can also be automatically eliminated, thereby further improving the accuracy of defect recognition in the low-magnification acid-etched sample. It is to be understood that the above description is intended to be illustrative, and not restrictive, of the embodiments of the present application.

In step S103, performing image segmentation on the second image according to a second pre-set condition to obtain a third image;

In embodiments of the present application, the distribution area of defects on the low-magnification acid-etched sample is defined by image segmentation of the second image, which is beneficial to accurately locating the clustering area of defects in the low-magnification acid-etched sample when recognizing defects in the low-magnification acid-etched sample. It is to be understood that the above description is intended to be illustrative, and not restrictive, of the embodiments of the present application.

In embodiments of the present application, in order to improve the effect when recognizing the defects in the low-magnification acid-etched sample, in the process of segmenting the second image, the segmentation of the second image is limited according to the second pre-set condition, so as to improve the clustering effect of the defects in the low-magnification acid-etched sample after the segmentation of the second image. It is to be understood that the above description is intended to be illustrative, and not restrictive, of the embodiments of the present application.

In some optional embodiments, in step of performing image segmentation on the second image according to the second pre-set condition to obtain the third image, specifically: taking the centre of the second image as the centre of a circle, performing concentric circle segmentation on the second image, and simultaneously performing quadrant segmentation on the second image according to a quadrant segmentation line of a pre-set quadrant to obtain the third image. It is to be understood that the above description is intended to be illustrative, and not restrictive, of the embodiments of the present application.

In embodiments of the present application, the center of the second image is taken as the center of the circle, and the second image is divided into multiple different concentric circle images according to different radius lengths; and, the second image is divided into quadrants by taking the center of the second image as the origin of the predetermined quadrants, and the second image is divided into quadrants according to the quadrant division lines. Therefore, the gridding processing of the second image is realized through the concentric circle segmentation and the quadrant segmentation, which is beneficial to accurately locate the cluster region of the defects in the low-magnification acid-etched sample when the defects in the low-magnification acid-etched sample are recognized. It is to be understood that the above description is intended to be illustrative, and not restrictive, of the embodiments of the present application.

In embodiments of the present application, when performing image segmentation on the second image, the more concentric circles are divided, the greater the number of preset quadrants, and the higher the recognition accuracy of the third image obtained after image segmentation when performing defect recognition. For example, when the second image is decomposed into 12 quadrants, the obtained third image is more accurate in defect recognition than when the second image is decomposed into 4 quadrants. It is to be understood that the above description is intended to be illustrative, and not restrictive, of the embodiments of the present application.

In step S104, performing defect pattern recognition on the third image according to a pre-known defect type, and obtaining distribution data of defect patterns in the low-magnification acid-etched sample;

In embodiments of the present application, the low magnification defects of the low-magnification acid-etched sample generally comprise: general porosity, central porosity, ingot segregation, spot-shaped (point) segregation, white bright band, center segregation, riser segregation, subcutaneous bubble, residual shrinkage hole, teeming lap, white spot, axial intergranular crack, internal bubble, heterometallic inclusions and non-metallic inclusions. In order to better recognize the defects in the low-magnification acid-etched sample, the low-magnification defects are classified according to point, line and plane, and thereby the efficiency and accuracy of defect pattern recognition on the third image are improved by establishing different defect patterns. It is to be understood that the above description is intended to be illustrative, and not restrictive, of the embodiments of the present application.

In embodiments of the present application, different defect patterns are respectively established according to the steel material standard and the different steel (or steel billet or continuous casting billet) defect patterns actually existing, and then defect pattern recognition is performed on the automatically processed and segmented images by a computer software system, so as to obtain qualitative types and distribution data of defects in the low-magnification acid-etched sample. It is to be understood that the above description is intended to be illustrative, and not restrictive, of the embodiments of the present application.

Figure 3:
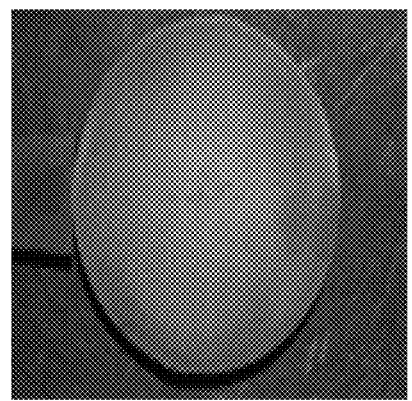
FIG. 3 is a schematic illustration of porosity defects in the low-magnification acid-etched sample provided according to some embodiments of the present application.
Figure 4:
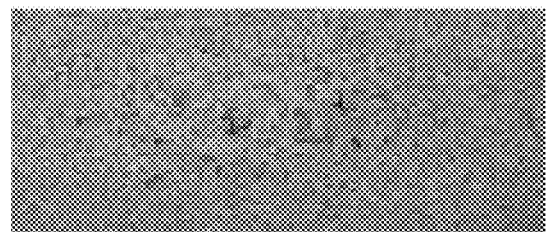
FIG. 4 is a schematic illustration of a central crack defect in a low-magnification acid-etched sample provided according to some embodiments of the present disclosure.
Figure 5:
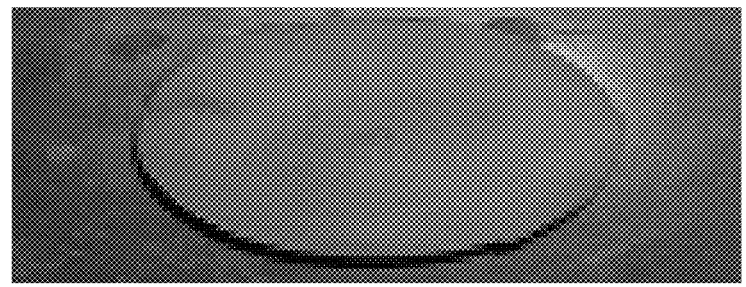
FIG. 5 is a schematic illustration of metal inclusions defects in a low-magnification acid-etched sample provided according to some embodiments of the present application.

In some optional embodiments, the defect types comprise: point defects, line defects and plane defects; wherein the point defects comprise: porosity (as shown in FIG. 3), non-metallic inclusions (as shown in FIG. 4), heterometallic inclusions and point segregation; the line defects comprise: subcutaneous cracks, central cracks (as shown in FIG. 5), intermediate cracks, corner cracks, teeming lap and flakes; the plane defects comprise: carbon segregation and square segregation. It is to be understood that the above description is intended to be illustrative, and not restrictive, of the embodiments of the present application.

In embodiments of the present application, low-magnification defects are divided into different defect types in the manner of points, lines and planes, which greatly improves the efficiency and accuracy of defect pattern recognition in low-magnification acid-etched sample. The low-magnification defects can be divided into 26 different clusters by means of points, lines and planes. Thereby, accurate localization and recognition of defects in the low-magnification acid-etched sample is achieved. It is to be understood that the above description is intended to be illustrative, and not restrictive, of the embodiments of the present application.

In embodiments of the present application, the existence and distribution of defects such as porosity, non-metallic inclusions, heterometallic impurities, spot-shaped segregation, subcutaneous cracks, central cracks, intermediate cracks, corner cracks, teeming lap and flakes, carbon segregation, square segregation, etc., in the steel or steel billet or continuous casting billet must be faithfully reflected before use according to the metallurgical standard, if the above-mentioned defects exist, it can be judged by "yes" or "no", and quantitative statistics and digital analysis can also be performed according to the existence area and frequency of the defects or according to the length and area of the defects, etc., and the ranking result is given according to the grade specified in the standard. It is to be understood that the above description is intended to be illustrative, and not restrictive, of the embodiments of the present application.

In some optional embodiments, in step of performing defect pattern recognition on the third image according to a pre-known defect type, and obtaining distribution data of defect patterns in the low-magnification acid-etched sample, specifically: performing feature extraction on a defect in the third image to obtain a defect feature in the third image; performing defect pattern recognition on defect feature according to pre-known defect types, and obtaining distribution data of defect patterns in the low-magnification acid-etched sample. It is to be understood that the above description is intended to be illustrative, and not restrictive, of the embodiments of the present application.

In embodiments of the present application, the defect features in the third image are obtained by extracting features such as color, texture and edge in the third image, and the obtained features such as color, texture and edge are compared and recognized with a pre-divided defect type, so as to obtain distribution data of defect pattern in low-magnification acid-etched sample. It is to be understood that the above description is intended to be illustrative, and not restrictive, of the embodiments of the present application.

In embodiments of the present application, other defects that may exist in the low-magnification acid-etched sample, such as: white point defects, saw tooth lines (zigzag lines) for crack features, etc., in the process of feature recognition, are distinguished from other types of features through wrapping feature selection, thereby improving the accuracy of feature recognition of such defects. It is to be understood that the above description is intended to be illustrative, and not restrictive, of the embodiments of the present application.

In step S105, obtaining quantitative data of defect patterns in the low-magnification acid-etched sample according to the third image and the distribution data of defect patterns in the low-magnification acid-etched sample;

In embodiments of the present application, quadrant segmentation and concentric circle segmentation are performed on the second image to obtain a grid-processed third image, and according to the grid-processed third image corresponding to the obtained distribution data of the defect pattern in the low-magnification acid-etched steel sample, the distribution of the defects in the low-magnification acid-etched sample can be obtained, and quantification of the image data for defects in the low-magnification acid-etched sample is achieved. It is to be understood that the above description is intended to be illustrative, and not restrictive, of the embodiments of the present application.

In some optional embodiments, in step of obtaining quantitative data of defect patterns in the low-magnification acid-etched sample according to the third image and the distribution data of defect patterns in the low-magnification acid-etched sample, specifically: performing digital analysis on the distribution data of the defect patterns in the low-magnification acid-etched sample corresponding to the third image to obtain quantitative data of the defect patterns in the low-magnification acid-etched sample. It is to be understood that the above description is intended to be illustrative, and not restrictive, of the embodiments of the present application.

In embodiments of the present application, after the third image is gridded, the data transmission is completed by compressing and coding the distribution data of defects in the low-magnification acid-etched sample; then, the compressed and encoded distribution data can be decompressed and reverse compiled by processing equipment such as workstations to realize digital analysis of the distribution data, so as to quantitatively analyze the defects in the low-magnification acid-etched sample. It is to be understood that the above description is intended to be illustrative, and not restrictive, of the embodiments of the present application.

In embodiments of the present application, the low-magnification sample image, the image after automatic image processing, the distribution data of defects in the low-magnification acid-etched sample, the quantitative data after digital analysis, etc., can all be stored by a server and other equipment, so as to perform operations such as calling and tracing at any time. It is to be understood that the above description is intended to be illustrative, and not restrictive, of the embodiments of the present application.

In step S106, ranking the defects in the low-magnification acid-etched sample according to the quantitative data of defect patterns in the low-magnification acid-etched sample.

In embodiments of the present application, ranking defects by quantitative data of defect patterns in the low-magnification acid-etched sample can effectively avoid the influence of subjective factors existing by inspectors in the defect ranking process, and improve the accuracy of defect ranking in the low-magnification acid-etched sample. It is to be understood that the above description is intended to be illustrative, and not restrictive, of the embodiments of the present application.

In some optional embodiments, in step of ranking the defects in the low-magnification acid-etched sample according to the quantitative data of defect patterns in the low-magnification acid-etched sample, specifically: comparing the quantitative data of the defect patterns in the low-magnification acid-etched sample with a preset quantitative standard, and ranking the defects in the low-magnification acid-etched sample according to the comparison result. It is to be understood that the above description is intended to be illustrative, and not restrictive, of the embodiments of the present application.

In embodiments of the present application, the preset quantitative standard may be a low-magnification defect ranking chart (for example: ranking chart of low-magnification defects of structural steel, ranking chart of low-magnification defects of continuous casting steel square billet, etc.) according to the steel (or steel billet or continuous casting billet), which shall be comprehensively set by those skilled in the art. It is to be understood that the above description is intended to be illustrative, and not restrictive, of the embodiments of the present application.

In embodiments of the present application, by continuously comparing the quantitative data of the defect pattern in the low-magnification acid-etched sample with a preset quantitative standard, a ranking result of the defect in the low-magnification acid-etched sample is obtained, and then a professional person checks the ranking result with a low-magnification tissue defect ranking graph, so as to continuously improve and optimize the method for automatically recognizing and ranking the low-magnification acid-etched defect based on machine vision, and improve the running speed of the method and the accuracy rate of the recognition and ranking result. It is to be understood that the above description is intended to be illustrative, and not restrictive, of the embodiments of the present application.

In the embodiments of the present application, the rating results of defects in the low-magnification acid etched samples can be automatically displayed through display devices such as monitors, and stored through devices such as servers so as to be recalled at any time; standard reports of identification and rating results can also be output according to the set output format requirements. It is to be understood that the above description is intended to be illustrative, and not restrictive, of the embodiments of the present application.

In embodiments of the present application, when a plurality of defects co-exist in the low-magnification acid-etched sample, the possible defects can be respectively recognized (identified) according to a certain priority level according to the difference in steel types, and various ranking results can be obtained. Through the feature extraction of multiple defect features, multiple defects in the low-magnification acid-etched steel sample are recognized. It is to be understood that the above description is intended to be illustrative, and not restrictive, of the embodiments of the present application.

In embodiments of the present application, the defects existing in the low-magnification acid-etched sample of steel or steel billets or continuous casting billet are recognized and ranked by computer machine vision and pattern recognition, which effectively avoids the problem of indicating qualitative description in each low-magnification defect ranking graph without quantitative assessment, so that the defects existing in the low-magnification acid-etched sample are recognized and ranked without relying on the visual impression of the inspector and the degree of recognition of the defects, etc., but the defects existing in the low-magnification acid-etched sample are automatically assessed by machine learning through image recognition of defect features. It effectively improves the accuracy of automatic recognition and ranking of defects of low-magnification acid-etched sample, and realizes automatic recognition and ranking of defects under different types (such as bearing steel, gear steel, structural steel, stainless steel, tool steel, die steel, etc.) and different states (such as continuous casting, die casting, electro slag, rolled material, etc.). It is to be understood that the above description is intended to be illustrative, and not restrictive, of the embodiments of the present application.

Example of System

Figure 6:
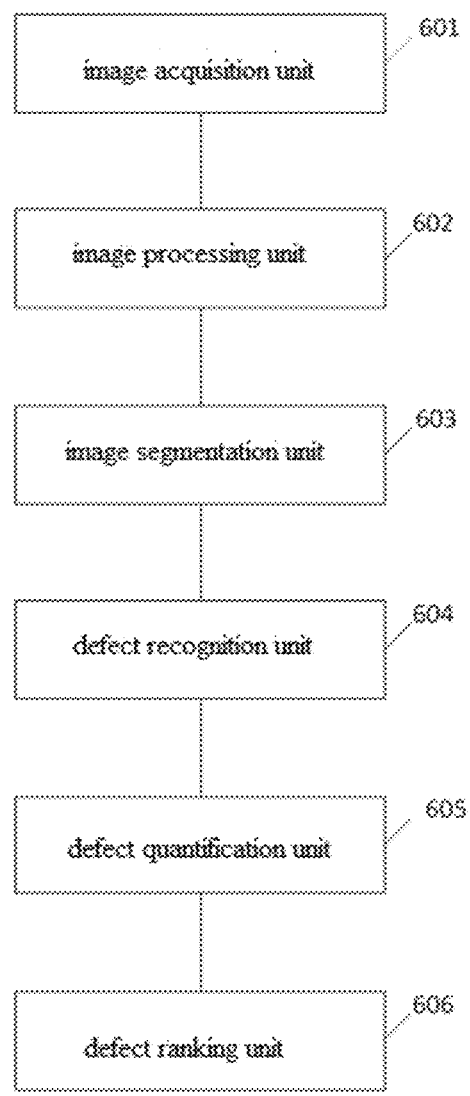
FIG. 6 is a schematic diagram of the machine vision-based automatic identification and rating system for low-magnification acid etching defect according to some embodiments of the present application.

FIG. 6 is a schematic diagram of the machine vision-based automatic identification and rating system for low-magnification acid etching defect, according to some embodiments of the present application. As shown in FIG. 6, the machine vision-based automatic identification and rating system for low-magnification acid etching defect, used for automatically recognizing and ranking defects of the low-magnification acid-etched steel or steel billet or continuous casting billet sample after acid etching, comprising: an image acquisition unit 601, configured to acquire images of the low-magnification acid-etched sample according to a first pre-set condition to obtain a first image; an image processing unit 602, configured to perform automatic image processing on the first image to obtain a second image; an image segmentation unit 603, configured to perform image segmentation on the second image according to a second pre-set condition to obtain a third image; a defect recognition unit 604, configured to perform defect pattern recognition on the third image according to a pre-divided defect type, and obtain distribution data of defect patterns in the low-magnification acid-etched sample; a defect quantification unit 605, configured to obtain quantitative data of defect patterns in the low-magnification acid-etched sample according to the third image and the distribution data of defect patterns in the low-magnification acid-etched sample; and a defect ranking unit 606, configured to rank the defects in the low-magnification acid-etched sample according to the quantitative data of defect patterns in the low-magnification acid-etched sample. It is to be understood that the above description is intended to be illustrative, and not restrictive, of the embodiments of the present application.

In some optional embodiments, the image acquisition unit 601 is further configured to perform image acquisition on the low-magnification acid-etched etched steel sample according to the set image background and scale to obtain the first image. It is to be understood that the above description is intended to be illustrative, and not restrictive, of the embodiments of the present application.

In some optional embodiments, the image segmentation unit 603 is further configured to take the centre of the second image as the centre of a circle, perform concentric circle segmentation on the second image, and simultaneously perform quadrant segmentation on the second image according to a quadrant segmentation line of a pre-set quadrant, to obtain the third image. It is to be understood that the above description is intended to be illustrative, and not restrictive, of the embodiments of the present application.

In some optional embodiments, the defect recognition unit 604 is further configured to perform feature extraction on the third image to obtain a defect feature in the third image, perform defect pattern recognition on defect feature according to pre-known defect types, and obtain distribution data of defect patterns in the low-magnification acid-etched sample. It is to be understood that the above description is intended to be illustrative, and not restrictive, of the embodiments of the present application.

In some optional embodiments, the defect quantification unit 605 is further configured to perform digital analysis on the distribution data of the defect patterns in the low-magnification acid-etched sample corresponding to the third image to obtain quantitative data of the defect patterns in the low-magnification acid-etched sample. It is to be understood that the above description is intended to be illustrative, and not restrictive, of the embodiments of the present application.

In some optional embodiments, the defect ranking unit 606 is further configured to compare the quantitative data of the defect patterns in the low-magnification acid-etched sample with a preset quantitative standard, and rank the defects in the low-magnification acid-etched sample according to the comparison result. It is to be understood that the above description is intended to be illustrative, and not restrictive, of the embodiments of the present application.

The machine vision-based automatic identification and rating system for low-magnification acid etching defect in the embodiments of the present application can realize the process and beneficial effects of the above-mentioned machine vision-based automatic identification and rating method for low-magnification acid etching defect, which will not be described here in details.

Figure 7:
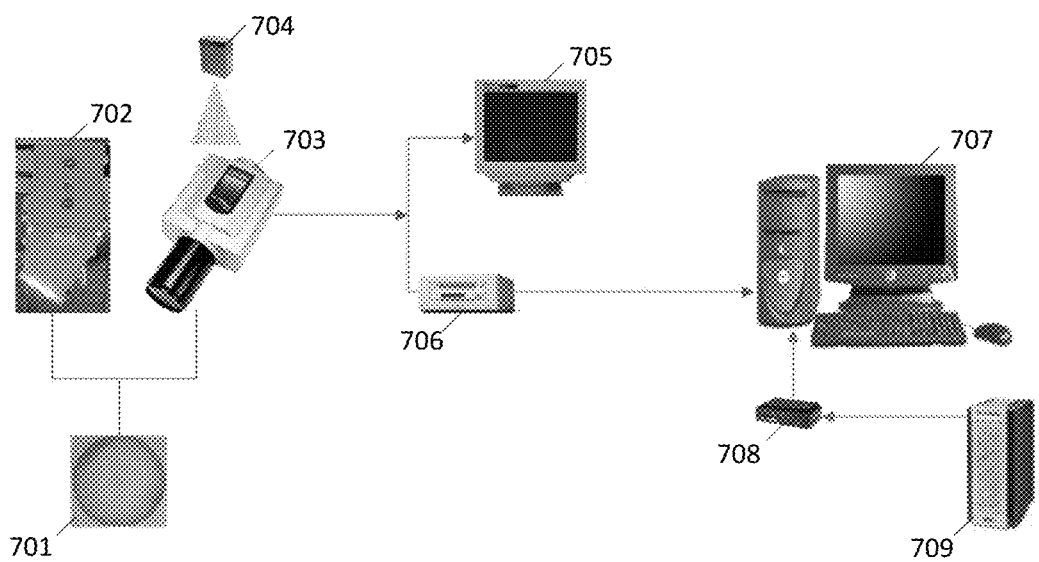
FIG. 7 is a schematic scene diagram of the machine vision-based automatic identification and rating system for low-magnification acid etching defect according to some embodiments of the present application.
Figure 8:
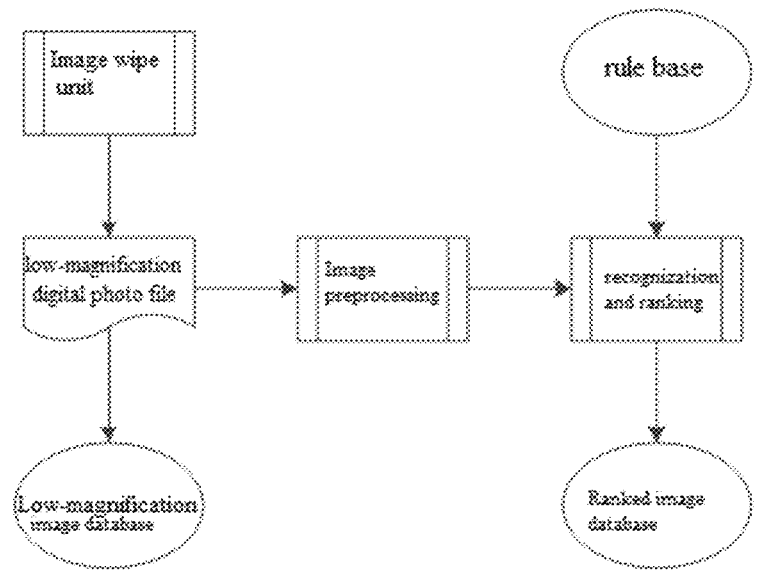
FIG. 8 is a logical representation diagram of the system for recognizing and ranking low-magnification acid-etched defects of the steel, according to some embodiments of the present application.

FIG. 7 is a schematic scene diagram of the machine vision-based automatic identification and rating system for low-magnification acid etching defect, according to some embodiments of the present application. FIG. 8 is a logical representation diagram of the system for recognizing and ranking low-magnification acid-etched defects of the steel according to some embodiments of the present application. As shown in FIG. 7 and FIG. 8, the image acquisition unit (a digital camera 703) performs image acquisition on the low-magnification acid-etched sample 701 via a digital camera 703 to obtain the first image; the light source system 702, which has been tested and meets the photographing requirements of the digital camera 703, performs a light supplement lamp on the digital camera 703 to stabilize the influence of weather or working day time on the imaging effect when the digital camera 703 acquires images. It is to be understood that the above description is intended to be illustrative, and not restrictive, of the embodiments of the present application.

In embodiments of the present application, the digital camera 703 can perform image acquisition on the low-magnification acid-etched sample 701 and can store the acquired image, for example, a low-magnification digital photo file (namely, the first image) obtained by image acquisition can be stored in a low-magnification image database; the first image stored in the digital camera 703 may also be read by the front-end acquisition apparatus 706 and subjected to automatic image processing (e.g. grayscale, white balance, etc.). It is to be understood that the above description is intended to be illustrative, and not restrictive, of the embodiments of the present application.

In embodiments of the present application, by setting the front-end display 705, the digital camera 703 performs image acquisition on the low-magnification acid-etched steel sample 701, the front-end acquisition apparatus 706 reads the first image in the digital camera 703, and the front-end acquisition apparatus 706 performs real-time monitoring and manual intervention on the process of gray scale and white balance processing on the first image, so as to find out anomalies and take corresponding measures in time. It is to be understood that the above description is intended to be illustrative, and not restrictive, of the embodiments of the present application.

In embodiments of the present application, the digital camera 703 can be remotely controlled by a remote controller 704 to acquire an image of the low-magnification acid-etched sample 701; the digital camera 703 is connected to the front-end acquisition apparatus 706 and the front-end display 705 via a data line to transmit the first image; data is transmitted between the front-end acquisition apparatus 706 and the workstation or system host 707 via twisted pair RJ45. It is to be understood that the above description is intended to be illustrative, and not restrictive, of the embodiments of the present application.

Figure 9:
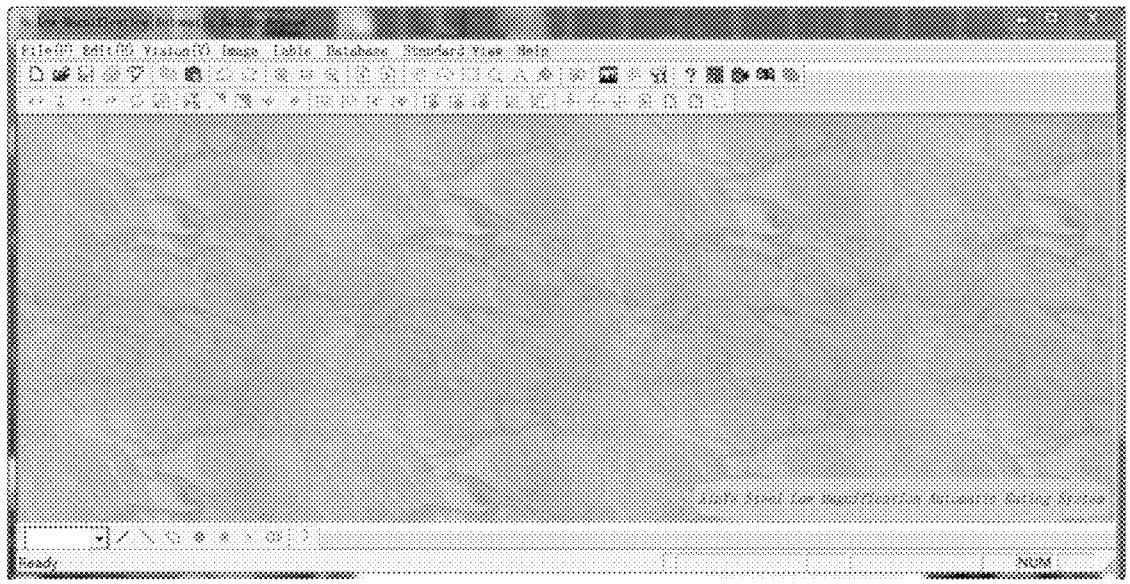
FIG. 9 is a schematic diagram of a software interface for implementing the machine vision-based automatic identification and rating method for low-magnification acid etching defect, through a OpenCV programming tool, according to some embodiments of the present application.
Figure 10:
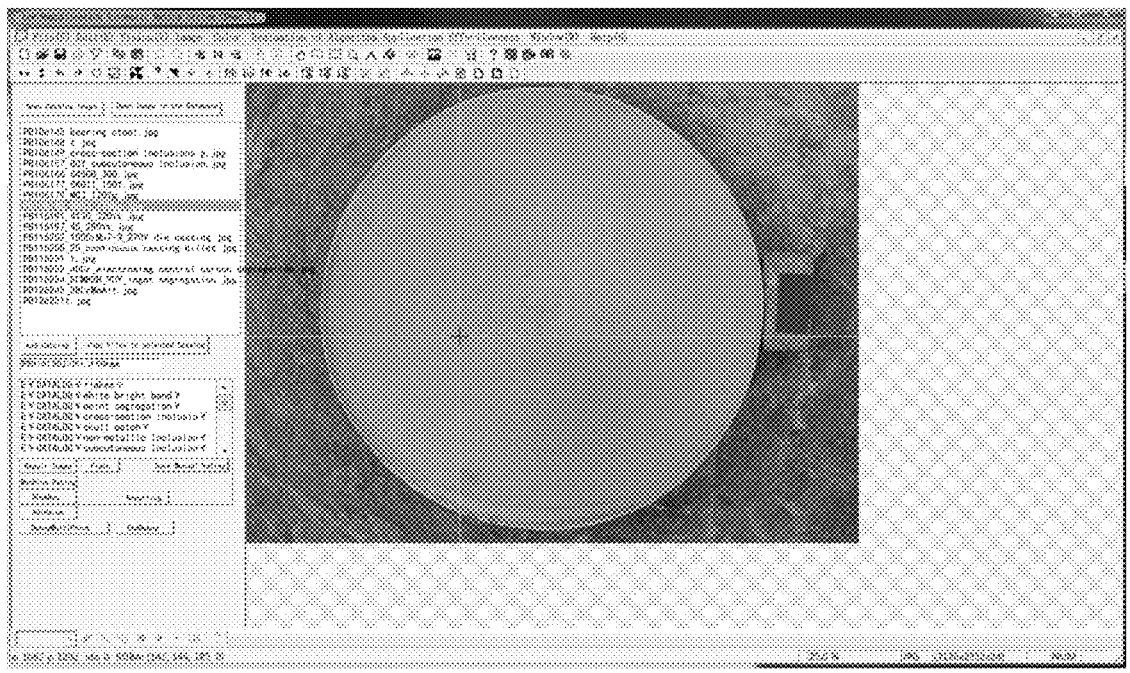
FIG. 10 is a schematic illustration of the application of the software shown in FIG. 9 to the recognition and ranking of low-magnification acid-etched defects.

In embodiments of the present application, software engineering (as shown in FIGS. 9, 10 and 11) of a machine vision-based automatic identification and rating method for low-magnification acid etching defect can be realized by a programming tool, and a rule base for recognizing and ranking low-magnification acid-etched defects of steel or steel billets or continuous casting billets is formed and written into a workstation or a system host 707 so as to recognize and rank the low-magnification acid-etched sample 701 according to the second image sent by the front-end acquisition apparatus 706, and a calculation result of the second image, distribution data, compressed encoding data, recognition and ranking results, etc. is stored by a ranked image database. It is to be understood that the above description is intended to be illustrative, and not restrictive, of the embodiments of the present application.

In embodiments of the present application, compressed and encoded data or the like in the workstation or system host 707 may be communicated with the server 709 via a network switch 708 or the like to store digitally parsed results in the server 709. It is to be understood that the above description is intended to be illustrative, and not restrictive, of the embodiments of the present application.

Example of Apparatus

FIG. 12 is a block diagram of an electronic apparatus provided according to some embodiments of the present application; as shown in FIG. 12, the electronic apparatus comprises:
one or more processors 1201;
a computer-readable medium 1202, which can be configured to store one or more programs,
when the one or more processors 1201 execute one or more programs, the following steps are implemented: acquiring images of the low-magnification acid-etched sample according to the first pre-set condition to obtain the first image; performing automatic image processing on the first image to obtain the second image; performing image segmentation on the second image according to a second pre-set condition to obtain the third image; performing defect pattern recognition on the third image according to the pre-known defect type, and obtaining distribution data of defect patterns in the low-magnification acid-etched sample; obtaining quantitative data of defect patterns in the low-magnification acid-etched sample according to the third image and the distribution data of defect patterns in the low-magnification acid-etched sample; ranking the defects in the low-magnification acid-etched sample according to the quantitative data of defects in the low-magnification acid-etched sample.

FIG. 13 is a hardware structure of an electronic apparatus provided according to some embodiments of the present application; as shown in FIG. 13, the hardware structure of the electronic apparatus may comprises: a processor 1301, a communication interface 1302, a computer-readable medium 1303 and a communication bus 1304;
wherein, the processor 1301, the communication interface 1302, and the computer-readable medium 1303 communicate with each other via the communication bus 1304;
alternatively, the communication interface 1302 can be an interface of a communication module, such as an interface of a GSM module;
wherein, the processor 1301 can be specifically configured to: acquire images of the low-magnification acid-etched sample according to a first pre-set condition to obtain a first image; perform automatic image processing on the first image to obtain a second image; perform image segmentation on the second image according to a second pre-set condition to obtain a third image; perform defect pattern recognition on the third image according to a pre-known defect type, and obtain distribution data of defect patterns in the low-magnification acid-etched sample; obtain quantitative data of defect patterns in the low-magnification acid-etched sample according to the third image and the distribution data of defect patterns in the low-magnification acid-etched sample; rank the defects in the low-magnification acid-etched sample according to the quantitative data of defects in the low-magnification acid-etched sample.

The processor 1301 may be a general purpose processor, such as a central processing unit (CPU), a Network Processor (NP), etc., it also may be a digital signal processor (DSP), an application specific integrated circuit (ASIC), an off-the-shelf programmable gate array (FPGA) or other programmable logic apparatus, a discrete gate or transistor logic apparatus, or a discrete hardware component. The various methods, steps, and logical blocks disclosed in the embodiments of the present application may be implemented or performed. The general purpose processor may be a microprocessor or the processor may be any conventional processor or the like.

The electronic apparatus of embodiments of the present application exist in a variety of forms including, but not limited to:

(1) Mobile communication apparatus: such apparatus are characterized by mobile communication capabilities and are primarily targeted to provide voice and data communications. Such terminals include: smart phones (e.g.: IPhone), multimedia handsets, functional handsets, and low-end handsets and the like.

(2) Super mobile personal computer apparatus: such apparatus belong to the category of personal computers, have computing and processing functions, and generally have mobile Internet access characteristics. Such terminals include: PDA, MID and UMPC apparatus and the like, e.g. Ipad.

(3) Portable entertainment apparatus: such apparatus can display and play multimedia content. Such apparatus include: audio, video players (e.g.: iPod), handheld game consoles, electronic books, and intelligent toys and portable car navigation apparatus.

(4) Server: an apparatus that provides computing services. The components of the server comprises a processor, a hard disk, a memory, a system bus, etc. The server is similar to a general purpose computer architectures, but have higher requirements in terms of processing capability, stability, reliability, security, scalability, manageability, etc. since a highly reliable service needs to be provided.

(5) Other electronic apparatus with data interaction.

It should be noted that, according to the needs of implementation, each part/step described in the embodiments of the present application may be split into more parts/steps, or two or more parts/steps or partial operations of the parts/steps may be combined into new parts/steps to achieve the purposes of the embodiments of the present application.

The methods according to the embodiments of the present application described above may be implemented in hardware, firmware, or as software or computer code that may be stored in a recording medium (such as CD ROM, RAM, floppy disk, hard disk or magneto-optical disk), or implemented by Network downloaded computer code originally stored in a remote recording medium or a non-transitory machine storage medium and to be stored in a local recording medium, so that the methods described herein may be processed by such software stored on a recording medium using a general purpose computer, a dedicated processor, or programmable or dedicated hardware such as ASIC or FPGA. It is to be appreciated that the computer, processor, microprocessor controller, or programmable hardware include a storage component (e.g. RAM, ROM, flash memory, etc.) that can store or receive software or computer code. When the software or computer code is accessed and executed by the computer, processor, or hardware, the machine vision-based automatic identification and rating method for low-magnification acid etching defect described herein is implemented. Further, when the general purpose computer accesses the code for implementing the methods illustrated herein, the execution of the code transforms the general purpose computer into a special purpose computer for executing the methods illustrated herein.

Those of ordinary skill in the art will appreciate that the various illustrative units and method steps described in connection with the embodiments disclosed herein can be implemented as electronic hardware, or combinations of computer software and electronic hardware. Whether such functionality is implemented as hardware or software depends upon the particular application and constraints imposed on the implementation. Those skill in the art may use different methods for each specific application to implement the described functions, but such implementation should not be considered beyond the scope of the embodiments of the present application.

It is to be understood that the various embodiments described in this specification are presented in a progressive manner, the same parts of the various embodiments can be referred to each other, and each embodiment focuses on the differences from other embodiments. In particular, apparatus and system embodiments are described more simply because they are substantially similar to the method embodiments, to which reference is made to some descriptions of the method embodiments. The apparatus and system embodiments described above are only schematic, wherein the units that are described as separate parts may or may not be physically separated, and the units that are indicated as units may or may not be physical units, that is, they may be located in one place, or it can be distributed over multiple network elements. Some or all of the modules may be selected to achieve the objectives of the embodiments according to actual needs. Those of ordinary skill in the art would have been able to understand and implement same without involving any inventive effort.

The above-mentioned embodiments are merely illustrative of the embodiments of the present invention, and those skilled in the art will be able to make various changes and modifications without departing from the spirit and scope of the embodiments. Various changes and modifications can be made, and therefore all equivalent technical solutions are within the scope of the embodiments of the present application, and the scope of protection of the embodiments of the present application shall be defined by the claims.

What is claimed is:

1. A machine vision-based automatic identification and rating method for low-magnification acid etching defect, used for automatically recognizing and ranking defects of a low-magnification acid-etched steel or steel billet or continuous casting billet sample after acid etching, comprising:

acquiring images of the low-magnification acid-etched sample according to a first pre-set condition to obtain a first image;

performing automatic image processing on the first image to obtain a second image;

performing image segmentation on the second image according to a second pre-set condition to obtain a third image, the image segmentation comprising taking the center of the second image as the center of a circle, performing concentric circle segmentation on the second image, and simultaneously performing quadrant segmentation on the second image according to a quadrant segmentation line of a pre-set quadrant to obtain the third image;

performing defect pattern recognition on the third image according to a pre-known defect type, and obtaining distribution data of defect patterns in the low-magnification acid-etched sample;

obtaining quantitative data of defect patterns in the low-magnification acid-etched sample according to the third image and the distribution data of defect patterns in the low-magnification acid-etched sample; and ranking the defects in the low-magnification acid-etched sample according to the quantitative data of defect patterns in the low-magnification acid-etched sample.

2. The machine vision-based automatic identification and rating method for low-magnification acid etching defect according to claim 1, wherein the step of acquiring images of the low acid etching sample according to the first pre-set condition to obtain the first image further comprises acquiring images of the low-magnification acid-etched sample according to a set image background and scale to obtain the first image.

3. The machine vision-based automatic identification and rating method for low-magnification acid etching defect according to claim 1, wherein the third image is a grid-processed image obtained by performing a quadrant segmentation and concentric circle segmentation on the second image.

4. The machine vision-based automatic identification and rating method for low-magnification acid etching defect according to claim 1, wherein the step of performing defect pattern recognition on the third image according to the pre-known defect type, and obtaining distribution data of defect patterns in the low-magnification acid-etched sample, further comprises performing feature extraction on the third image to obtain a defect feature in the third image, and performing defect pattern recognition on the defect feature according to pre-divided defect types, obtaining distribution data of defect patterns in the low-magnification acid-etched sample.

5. The machine vision-based automatic identification and rating method for low-magnification acid etching defect according to claim 1, wherein the step of obtaining quantitative data of defect patterns in the low-magnification acid-etched sample according to the third image and the distribution data of defect patterns in the low-magnification acid-etched sample further comprises performing digital analysis on the distribution data of the defect patterns in the low-magnification acid-etched sample corresponding to the third image to obtain quantitative data of the defect patterns in the low-magnification acid-etched sample.

6. The machine vision-based automatic identification and rating method for low-magnification acid etching defect according to claim 1, wherein the step of ranking the defects in the low-magnification acid-etched sample according to the quantitative data of defect patterns in the low-magnification acid-etched sample further comprises comparing the quantitative data of the defect patterns in the low-magnification acid-etched sample with a preset quantitative standard, and ranking the defects in the low-magnification acid-etched sample according to a comparison result.

7. The machine vision-based automatic identification and rating method for low-magnification acid etching defect according to claim 1, wherein the defects include point defects, line defects and plane defects; and wherein the point defects include porosity, non-metallic inclusions, heterometallic inclusions and point segregation; the line defects comprise subcutaneous cracks, central cracks, intermediate cracks, corner cracks, teeming lap and flakes; and the plane defects include carbon segregation and square segregation.

8. A machine vision-based automatic identification and rating system for low-magnification acid etching defect, used for automatically recognizing and ranking defects of low-magnification acid-etched steel or steel billet or continuous casting billet sample after acid etching, the low-magnification acid-etched sample being obtained by performing an acid etching inspection to a transverse end face of steel or steel billet or continuous casting billet in a low-magnification inspection, the automatic identification and rating system for low-magnification acid etching defect comprising:

an image acquisition unit, configured to acquire images of the low-magnification acid-etched sample according to a first pre-set condition to obtain a first image;

an image processing unit, configured to perform automatic image processing on the first image to obtain a second image;

an image segmentation unit, configured to perform image segmentation on the second image according to a second pre-set condition to obtain a third image by taking the center of the second image as the center of a circle, performing concentric circle segmentation on the second image, and simultaneously performing quadrant segmentation on the second image according to a quadrant segmentation line of a pre-set quadrant to obtain the third image;

a defect recognition unit, configured to perform defect pattern recognition on the third image according to a pre-divided defect type and obtain distribution data of defect patterns in the low-magnification acid-etched sample;

a defect quantification unit, configured to obtain quantitative data of defect patterns in the low-magnification acid-etched sample according to the third image and the distribution data of defect patterns in the low-magnification acid-etched sample; and a defect ranking unit, configured to rank the defects in the low-magnification acid-etched sample according to the quantitative data of defect patterns in the low-magnification acid-etched sample.

9. A non-transitory computer-readable medium on which a computer program is stored, wherein, when executed, the computer program causes a computer to perform the machine vision-based automatic identification and rating method for low-magnification acid etching defect according to claim 1.

10. An electronic apparatus, comprising:
a memory,
a processor, and
a program stored in the memory and executable on the processor, such that when the processor executes the program, the machine vision-based automatic identification and rating method for low-magnification acid etching defect according to claim 1 is implemented.

* * * * *